Patented Jan. 29, 1946

2,393,723

UNITED STATES PATENT OFFICE 2,393,723

PREPARATION OF INTERMEDIATES USEFUL FOR AMINO ACID SYNTHESES

Benjamin F. Tullar, East Greenbush, N. Y., assignor to Winthrop Chemical Company, Inc., New York, N. Y., a corporation of New York No Drawing. Application December 19, 1944, Serial No. 568,937

8 Claims. (Cl. 260—464)

This invention relates to a process for the reductive acylation of isonitrosocyanoacetic esters.

Cyanoacetic esters are valuable starting material for use in various types of condensation reactions. If it is desired that the condensation product contain an amino substitutent, for example in the preparation of various alpha-amino acids, a convenient method for obtaining such a result comprises the use of an acylaminocyanoacetic ester in the condensation reaction, followed by hydrolysis of the acylamino group in the reaction product to the amino group, as set forth, for example, in the copending application of Noel F. Albertson et al., Serial No. 524,776, filed March 2, 1944.

It is an object of my invention to provide a convenient and economical method for obtaining alkyl (lower aliphatic acyl) aminocyanoacetates, which compounds have previously not been available in satisfactory yield. The corresponding aminocyanoacetic esters have not as yet been prepared and thus are not available for use in the usual acylation procedures for obtaining acylamino compounds. Cerchez and Colesiu [Compt. rend., 194, 1954 (1932)] prepared ethyl acetylaminocyanoacetate by reducing ethyl acetyloximinocyanoacetate with aluminum amalgam. This method is not satisfactory, however, since ethyl acetyloximinocyanoacetate is obtained by acetylation of oximinocyanoacetate, a process which yields a mixture of approximately equal amounts of both O-acetyl and N-acetyl products, of which only the latter will yield on reduction the desired ethyl acetylaminocyanoacetate.

My present process comprises reacting an alkyl isonitrosocyanoacetate with a cold aqueous solution of a water-soluble metal hydrosulfite and a lower aliphatic acid anhydride, whereby the isonitroso group is converted to an acylamino group, and there is obtained as the product the corresponding alkyl acylaminocyanoacetate.

The alkyl isonitrosocyanoacetates required as starting materials in my process are readily obtained in high yield by nitrosating the appropriate alkyl cyanoacetate. A particular advantage of my process resides in the fact that it is applicable either to the pure alkyl isonitrosocyanoacetate or directly to the nitrosation reaction mixture which contains the isonitroso ester, thus obviating the need for isolation and purification of the latter intermediate.

The lower aliphatic acid anhydrides employed as acylating agents in my process, for example acetic anhydride, propionic anhydride, and butyric anhydride, are susceptible to hydrolysis in aqueous media, and for that reason it is necessary that the reaction mixture be maintained at a temperature low enough to prevent any appreciable hydrolysis of the acid anhydride before it has served its function as an acylating agent. I have found that a temperature of 0–20° C. is satisfactory for the attainment of this result. It is apparent that this temperature range may be varied somewhat, but progressively lower yields are obtained if the temperature is allowed to rise much above 20° C.

As the water-soluble metal hydrosulfite which is used in my process, I prefer to use sodium hydrosulfite. It is cheaper than most other hydrosulfites of this type, such as potassium hydrosulfiate, and permits more convenient isolation of the product than is the case when the cheap zinc hydrosulfite is used.

My invention is illustrated by the following examples without, however, being restricted thereto.

*Example 1*

28.4 grams of ethyl isonitrosocyanoacetate, M. P. 129–130° C., are suspended in 150 ml. of water to which has been added 50 g. of ice. To this suspension there is added 40 ml. of acetic anhydride and the mixture is then cooled in an ice-salt bath. 60 g. of sodium hydrosulfite are slowly added to the mixture, the temperature of which is maintained at 0–10° C., ice being added directly to the reaction mixture if necessary to supplement the ice-salt bath. After all the sodium hydrosulfite has been added, the reaction mixture is stirred at 0–10° C. for thirty minutes, during which time a portion of the product crystallizes from the solution. The reaction mixture is then saturated with sodium chloride and filtered. The solid thus collected is washed with about 10 ml. of ice water and dried at 30° C. in vacuo. The dry product, which is ethyl acetylaminocyanoacetate, weights 25 g. It can be purified by recrystallization from 15% aqueous acetic acid solution. The pure compound melts at 129° C.

*Example 2*

To a solution of 80 grams of sodium nitrite in 300 ml. of water are added 113 g. of ethyl cyanoacetate. This solution is cooled in an ice-salt bath and during a thirty minute period 80 ml. of acetic acid are added to the solution with rapid stirring. The reaction mixture is stirred for one hour further, during which time the temperature drops to about 5° C. and some solid begins to separate from solution.

There is added to the reaction mixture 1000 g. of ice and then 250 ml. of acetic anhydride. During a period of about twenty minutes, 350 g. of sodium hydrosulfite are added in small portions to the mixture. The crystalline solid which separates is collected on a filter. A further portion of product can be obtained by saturating the filtrate with sodium chloride. The combined solids, which weigh about 115 g., are treated with 300 ml. of hot acetone and any acetone-insoluble material is separated and discarded. From the acetone solution there is obtained by addition of petroleum ether and ethyl ether 77 g. of ethyl acetylaminocyanoacetate.

When propionic acid anhydride is used as the acylating agent instead of acetic anhydride, as in the above examples, ethyl propionylaminocyanoacetate is obtained as the product.

While ethyl isonitrosocyanoacetate has been employed in the above examples, it is to be understood that there can be substituted for this compound any other such alkyl isonitrosocyanoacetate; for example, methyl isonitrosocyanoacetate, isopropyl isonitrosocyanoacetate or sec-butyl isonitrosocyanoacetate, in which event the final products are the corresponding alkyl acylaminocyanoacetates.

I claim:

1. The process for preparing an alkyl (lower aliphatic acyl) aminocyanoacetate which comprises reacting an alkyl isonitrosocyanoacetate with a cold aqueous solution of a water-soluble metal hydrosulfite and a lower aliphatic acid anhydride.

2. The process for preparing an alkyl acetylaminocyanoacetate which comprises reacting an alkyl isonitrosocyanoacetate with a cold aqueous solution of a water-soluble metal hydrosulfite and acetic anhydride.

3. The process for preparing an alkyl propionylaminocyanoacetate which comprises reacting an alkyl isonitrosocyanoacetate with a cold aqueous solution of a water-soluble metal hydrosulfite and propionic anhydride.

4. The process for preparing an alkyl acetylaminocyanoacetate which comprises reacting an alkyl isonitrosocyanoacetate with a cold aqueous solution of sodium hydrosulfite and acetic anhydride.

5. The process for preparing an alkyl propionylaminocyanoacetate which comprises reacting an alkyl isonitrosocyanoacetate with a cold aqueous solution of sodium hydrosulfite and propionic anhydride.

6. The process for preparing ethyl acetylaminocyanoacetate which comprises reacting ethyl isonitrosocyanoacetate with a cold aqueous solution of sodium hydrosulfite and acetic anhydride.

7. A process for preparing an alkyl (lower aliphatic acyl) aminocyanoacetate which comprises reacting an alkyl isonitrosocyanoacetate with a water-soluble metal hydrosulfite and a lower aliphatic acid anhydride at a temperature at which the acid anhydride is substantially unhydrolyzed.

8. A process for preparing an alkyl (lower aliphatic acyl) aminocyanoacetate which comprises reacting an alkyl isonitrosocyanoacetate with a water-soluble metal hydrosulfite and an acylating agent at a temperature below that at which the acylating agent undergoes substantial hydrolysis.

BENJAMIN F. TULLAR.